(12) United States Patent
Herrera et al.

(10) Patent No.: US 11,738,725 B2
(45) Date of Patent: Aug. 29, 2023

(54) ELECTRONIC PARACHUTE DEPLOYMENT SYSTEM

(71) Applicant: Adrian Herrera, Fort Worth, TX (US)

(72) Inventors: Adrian Herrera, Fort Worth, TX (US);
John William Kissam, Watauga, TX (US)

( * ) Notice: Subject to any disclaimer, the term of this patent is extended or adjusted under 35 U.S.C. 154(b) by 750 days.

(21) Appl. No.: 16/731,330

(22) Filed: Dec. 31, 2019

(65) Prior Publication Data
US 2021/0197773 A1 Jul. 1, 2021

(51) Int. Cl.
| B60T 7/16 | (2006.01) |
| B60T 1/16 | (2006.01) |
| B60T 17/18 | (2006.01) |
| B60T 11/04 | (2006.01) |
| B64D 17/62 | (2006.01) |

(52) U.S. Cl.
CPC ............... *B60T 7/16* (2013.01); *B60T 1/16* (2013.01); *B60T 11/046* (2013.01); *B60T 17/18* (2013.01); *B64D 17/62* (2013.01)

(58) Field of Classification Search
CPC . B60T 7/16; B60T 1/16; B60T 11/046; B60T 17/18; B64D 17/62
See application file for complete search history.

(56) References Cited

U.S. PATENT DOCUMENTS

| 2003/0193404 A1 | 10/2003 | Joao |
| 2007/0145193 A1 | 6/2007 | Hakki |
| 2013/0221159 A1 | 8/2013 | Giannakopoulos |
| 2014/0025950 A1 | 1/2014 | Peeters |
| 2016/0280380 A1 | 9/2016 | Fourie |
| 2018/0141668 A1* | 5/2018 | Vander Lind .......... B64D 17/72 |
| 2020/0198790 A1* | 6/2020 | Yagihashi ............ B64D 17/025 |

FOREIGN PATENT DOCUMENTS

| CN | 110475718 A * | 11/2019 | .......... B64C 39/024 |
| EP | 3505447 A1 * | 7/2019 | .......... B64D 17/383 |
| WO | 9420336 A2 | 9/1994 | |
| WO | WO-2019039062 A1 * | 2/2019 | .......... B64C 39/024 |
| WO | 2019077365 A1 | 4/2019 | |
| WO | WO-2019143944 A1 * | 7/2019 | ......... B64C 29/0033 |

OTHER PUBLICATIONS

International Search Report and Written Opinion of the International Searching Authority dated Mar. 18, 2021 from International Application No. PCT/US2020/061991.

* cited by examiner

*Primary Examiner* — Melanie Torres Williams

(57) ABSTRACT

An electronic parachute deployment system including an electronic actuator, a control module, a deployment actuator, and a release mechanism. A parachute is positioned on a payload device, such as a racecar, to slow or stop the payload upon receipt of an electronic deployment activation signal. The electronic deployment signal is verified, including determining proper voltage and source. The deployment system includes multiple redundancies including mechanical deployment redundancy, remote deployment redundancy, and power supply redundancy. The control module responsible for monitoring deployment includes indicators and sensors to indicate a status, operation, or mode relative to the operability of the payload device, relative to components of the release mechanism, and relative to the parachute deployment.

3 Claims, 14 Drawing Sheets

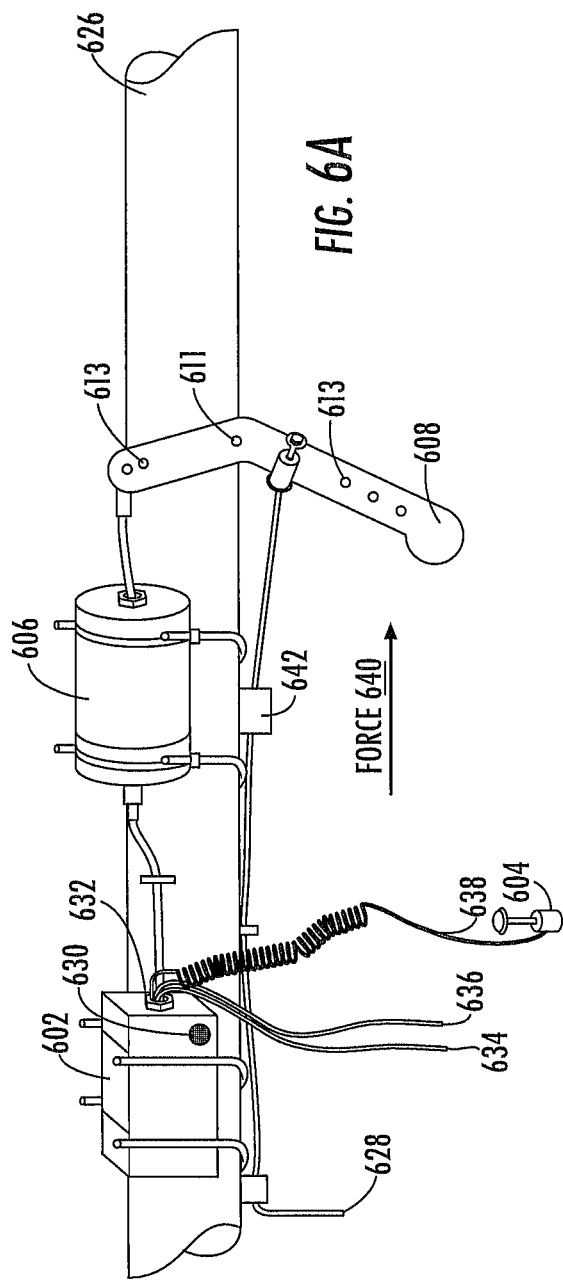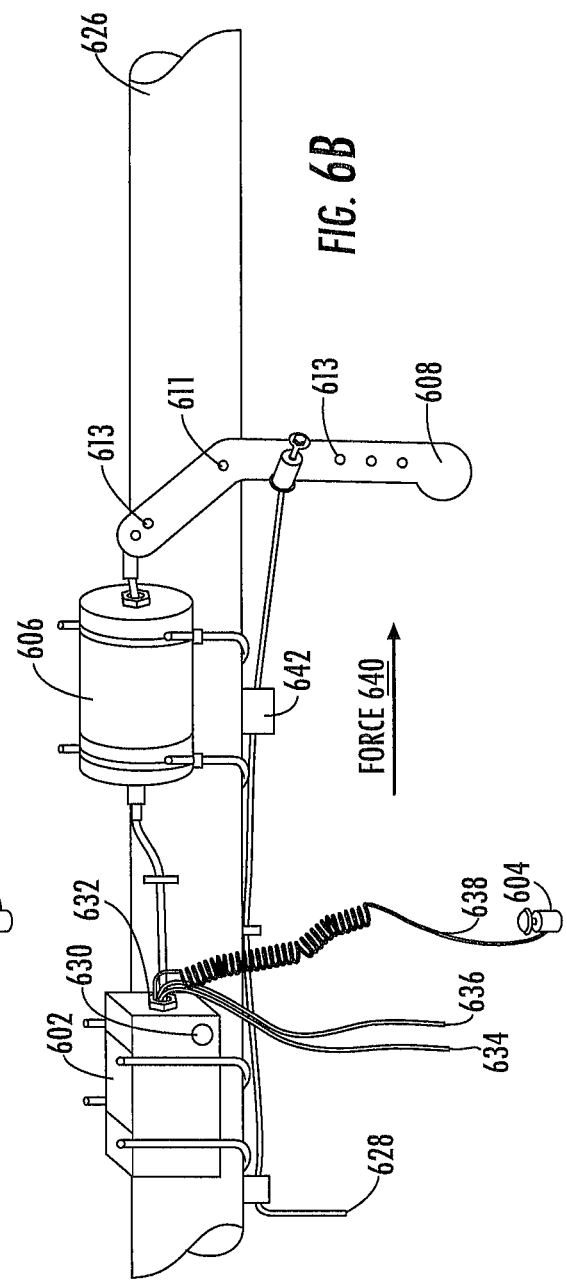

ELECTRONIC PARACHUTE DEPLOYMENT SYSTEM

BACKGROUND

1. Field of the Invention

The present application relates to parachute deployment systems. In particular, the present application relates to electronic parachute deployment systems for the racing industry.

2. Description of Related Art

Currently, racecars, such as those used for drag racing, use manual levers for parachute deployment. For example, these racecars often include a manual lever located in proximity to the driver, which must be manually actuated at the end of the race or during an emergency situation to reduce vehicle speed. Race tracks are getting smaller as drag racing is beginning to be more available in a variety of different venues. Lever actuation requires at least three different driver actions, including reaching, grasping, and pulling. Requiring a driver to perform at least these three actions each time parachute deployment is necessary is time-consuming, which could have devastating consequences to operators or spectators. Manual actuation also involves adjusting cable tension, or otherwise manually actuating physical components, which can cause further delay between actuation and chute deployment.

Although current parachute deployment systems provide highly valued safety measures, they do not include additional safety features. Unfortunately, current parachute deployment systems provide few if any options for racecar drivers to have redundant electronic or physical safety measures. They also provide few options for monitoring functionality of specific safety features associated with parachute deployment. Foreseeing the need for shorter stopping distances, or attempting to meet existing safety requirements, racecar owners often install large, bulky bags and storage containers on the vehicle for parachute deployment. However, the ability to monitor specific safety features and proper chute deployment operation is nearly impossible or non-existent. Furthermore, deployment from the bulky bags can be slow, causing additional, unnecessary delay.

Although the aforementioned methods of parachute deployment represent great strides in the area of parachute deployment systems, many shortcomings remain.

DESCRIPTION OF THE DRAWINGS

The novel features believed characteristic of the invention are set forth in the appended claims. However, the invention itself, as well as a preferred mode of use, and further objectives and advantages thereof, will best be understood by reference to the following detailed description when read in conjunction with the accompanying drawings, wherein:

FIG. 6A is a perspective view of an actuation assembly and control module in a resting position;

FIG. 6B is a perspective view of the actuation assembly and control module of FIG. 6B in an actuated position;

DETAILED DESCRIPTION OF THE PREFERRED EMBODIMENT

Figure 1:
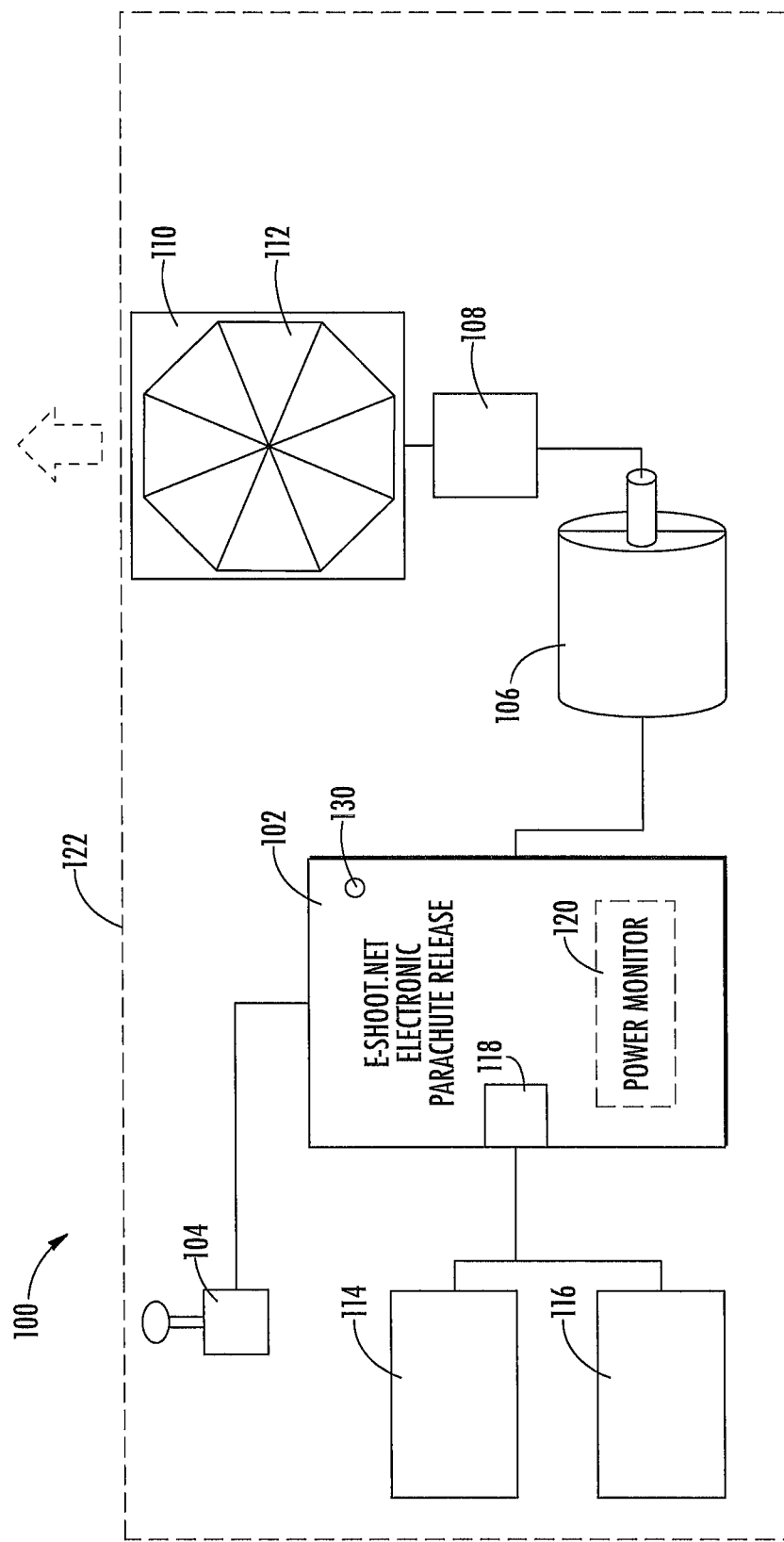
FIG. 1 is a block diagram of an electronic parachute deployment system.

Referring to FIG. 1 in the drawings, an electronic parachute deployment system 100 is illustrated. Electronic parachute deployment system 100 includes a control module 102 having memory and a processor, electronic actuator 104, such as a pressure activated button, control-interfacing deployment actuator 106, such as a push/pull solenoid, and chute-interfacing release mechanism 108. In a preferred embodiment, the chute-interfacing release mechanism is configured to deploy a parachute. For example, electronic parachute deployment system 100 receives an electronic activation signal from electronic actuator 104, converts the signal to a proper voltage for solenoid 106, relays the signal to solenoid 106, and solenoid 106 activates the release mechanism, thereby deploying the parachute.

Electronic actuator 104 includes a push button hard-wired to a control module, Bluetooth circuitry, radio frequency and circuitry, barometric pressure sensor circuitry, altimeter circuitry, infrared circuitry, pressure circuitry, or any combination thereof.

Solenoid 106 is connected to release mechanism 108. Release mechanism 108, includes but is not limited to, a ripcord, an altimeter, a Bowden cable, a lever, or combinations thereof. In a preferred embodiment, the chute-interfacing release mechanism is connected to a lever.

Release mechanism 108 is connected to parachute container 110, and receives a manual activation or an electronic activation signal from solenoid 106. The release mechanism is connected to parachute container 110 in order to deploy parachute 112. Parachute container 110 is rigid, semi-rigid, flexible, semi-flexible, or a combination thereof.

Control module 102 is connected to power source 114, redundant power source 116, and voltage regulator 118. Voltage regulator 118 is a fuse, circuit breaker, a capacitor, a resistor, or a combination thereof. Power source 114 and redundant power source 116 are direct current power sources. In a preferred embodiment, the power sources are batteries ranging from 12-24 volt batteries.

Although the power supply to control module 102 is depicted as a battery, the present application encompasses additional, and/or interchangeable power supplies. For example, the power supply to control module 102 includes a cell battery, lithium battery, capacitor, solar cells, monitoring/regulating integrated circuits, or any combination thereof. When power sources of different capacity, voltage, or amperage are connected, depending on the payload to which it is attached, one or more additional voltage regulators 118 may be added to the system.

Control module 102 includes power monitor 120 for monitoring voltages of the power sources and optimizing energy availability and usage. Preferably, power monitor 120 is a battery monitor. For example, the memory of the control module is pre-programmed with computer-executable instructions for determining a definitive battery voltage, comparing that voltage to a voltage of the redundant battery, and switching to the redundant battery as the power supply when the voltage of the redundant batter is beyond a threshold value or the first battery voltage is below a threshold value.

Control module 102 includes a processor, such as an ARM, or similar microprocessor and a memory unit, such as flash or other solid-state memory. The control module includes a circuit board having ports, modules, and integrated circuits, such as GPIO, Ethernet, transceiver, I2C bus, AUX, SPI, power supply, GSM/GPRS modem, and combinations thereof.

Preferably, each of the components of parachute deployment system 100 are located on or within payload 122. In a preferred embodiment, payload 122 is a racecar, such as a drag racer with a roll cage. However, in alternative embodiments, payload 122 includes a drone or other unmanned aerial vehicle (UAV), a boat, a rocket, a Soyuz capsule, or a manned aircraft.

Control module 102 includes indicator 130. Indicator 130 includes any user output capable of indicating at least two states of the control module. Preferably, indicator 130 includes a green LED indicating an idle state of the parachute deployment system. Indicator 130 further includes a red LED to indicate an active or deployment state of the control module. Indicator 130 further includes any means for providing a control state or status to an operator, including visual and audio output, such as an audible tone or voice alert. In at least one embodiment, indicator 130 includes a portion of a head-up display (HUD).

Figure 2:
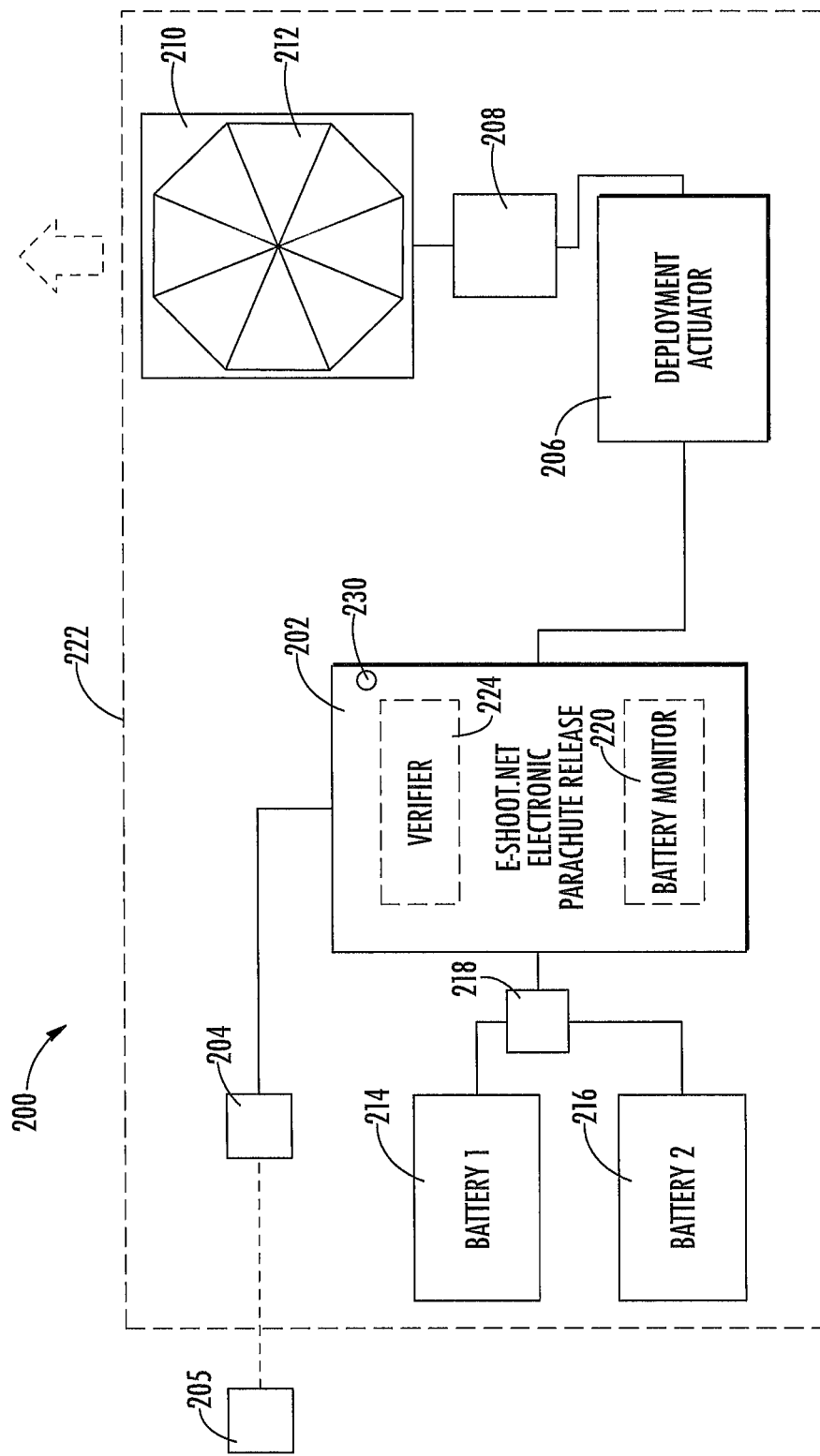
FIG. 2 is a block diagram of an electronic parachute deployment system having a remote deployment feature.

Referring now also to FIG. 2 in the drawings, electronic parachute deployment system 200 includes control module 202 connected to payload transceiver 204. Payload transceiver 204 is connected, wirelessly, to remote device 205 to receive a remote deployment activation signal. Control module 202 is further connected to deployment actuator 206 to send a deployment signal to release mechanism 208. Release mechanism 208 receives the deployment activation signal from control-interfacing deployment actuator 206 to actuate a parachute connector. In a preferred embodiment, the activation of the release mechanism 208 further triggers opening of chute container 210, which deploys parachute 212.

In a preferred embodiment, deployment actuator 206 is a solenoid, as depicted in FIG. 1. In alternative embodiments, deployment actuator 206 includes a solenoid, a stepper motor, an actuator, a motor, a linear drive system, a servo motor or drive system, a proximity sensor, an altimeter, or any combination thereof.

In a preferred embodiment, the chute-interfacing release mechanism 208 is a second linear actuator connected to a puncture needle. The chute-interfacing release mechanism 208 further includes a Bowden cable, a second linear actuator connected to a cam locking device, a rod, a lever, a string, a ripcord, a strap, linkage, or any combination thereof. It is noted that the terms "release drive unit" and "release mechanism" are used interchangeably in the present application.

Control module 202 is further connected to battery 214, redundant batter 216, voltage regulator 218, and battery monitor 220. It is noted that although voltage regulator 218 is depicted as being associated in proximity to the batteries, such as on battery connectors, this depiction is not limiting. For example, voltage regulator 218 may also be placed on a circuit board of control module 202.

Control module 202 further includes verifier 224. For example, a set of computer-executable instructions are configured to receive an electronic activation signal from remote device, and verify that the remote device has authorization to communicate with the control module. The verification includes, but is not limited to, checking source identifiers such as MAC addresses, destination identifiers, Mobile Station Identity (IMEI) number, Mobile Equipment Identifier (MEID) number, unique device identifier (UDID), universally unique identifier (UUID), amplitude, frequency, signal type, modulation type, number of access attempts, access attempt frequency, and combinations thereof. The verification checking includes a comparison of received hardware or signal identifiers to expected values, including but not limited to, table entry values, administrator inputs, stored sequence values, and combinations thereof. If a signal does not pass the verification, it is blocked from components of the parachute deployment system, including the deployment actuator and the release mechanism.

Preferably, each of the components of parachute deployment system 200 are located on or within payload 222, except for remote device 205, which is remotely located relative to payload 222. In a preferred embodiment, payload 222 is a racecar, such as a drag racer with a roll cage. However, in alternative embodiments, payload 222 includes a drone or other unmanned aerial vehicle (UAV), a boat, or a manned aircraft.

Figure 3:
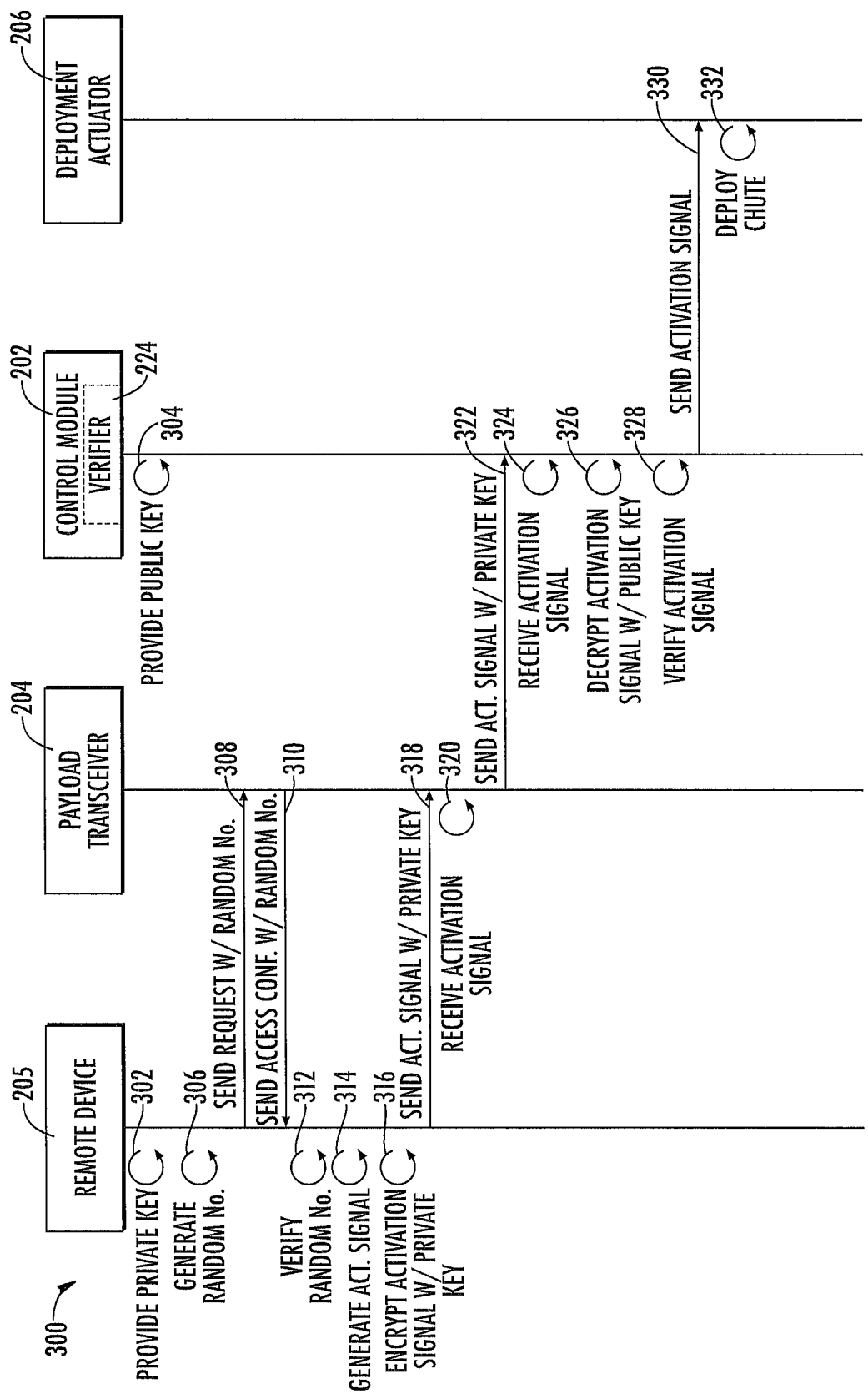
FIG. 3 is a time sequence diagram of a method of electronic deployment using the remote deployment feature of FIG. 2.

Referring now also to FIG. 3 in the drawings, method 300 for remotely and electronically deploying a parachute from a payload using asymmetric encryption is illustrated. It is noted that although an asymmetric encryption algorithm is depicted, other forms of secure signal transmission are encompassed by the features of the present application, including but not limited to, symmetric encryption, Encryption as a Service (Eaas), Link-level encryption, and use of cryptographic hash functions.

Step 302 includes providing a private key to remote device 205. For example, the private key is pre-programmed into a memory of the remote device.

Step 304 includes providing a public key to control module 202. For example, the public key is pre-programmed into a memory of the control module. It is noted that although the public key is stored in the control module, in an alternative embodiment, the private key may be stored in the control module with the corresponding public key being stored in the remote device.

Step 306 includes activating remote device 205 to generate a request signal that includes a random number. For example, a key fob includes a pressure-activated button, which is pressed to generate the request signal. By way of another example, an interactive icon of a UI of a mobile device is activated to generate the random number.

Step 308 includes sending the request signal including the random number to payload transceiver 204. Payload transceiver 204 receives the request signal.

Step 310 includes sending, from the payload transceiver to remote device 206, an access confirmation signal which includes the random number.

Step 312 includes receiving, at the remote device, the access confirmation signal including the random number. Step 312 further includes the remote device verifying that the random number received in the access confirmation signal is the same as the random number sent in the request signal.

When the random number is verified, step 314 includes generating a chute deployment activation signal. The generation of the chute deployment activation signal is automatic or is triggered by the initial user input as long as the random number initially generated has been verified.

Step 316 includes encrypting the chute deployment activation signal with the private encryption key. For example, a Rivest-Shamir-Adleman (RSA) algorithm may be used to encrypt the activation signal.

Step 318 includes sending the activation signal that has been encrypted with the private key to payload transceiver 204.

Step 320 includes receiving, at the payload transceiver, the encrypted activation signal.

Step 322 includes sending the encrypted activation signal from the payload transceiver to control module 202.

Step 324 includes receiving, at the control module, the encrypted deployment activation signal.

Step 326 includes decrypting the activation signal at the control module. For example, the public key stored in memory at the control module is used to decrypt the deployment activation signal.

Step 328 includes verifying the activation signal is in the proper form to be received by the deployment actuator. For example, step 328 may include verifier 224 converting voltages, changing frequency or amplitudes, or otherwise checking, modifying, and/or amplifying the activation signal such that the deployment actuator may receive the activation signal.

Step 330 includes sending the deployment activation signal from the control module to deployment actuator 206. In a preferred embodiment, the deployment actuator is a solenoid. Step 330 further includes indicating at the control module a deployment state based on the state of the solenoid. For example, when no power is detected at, or supplied to, the armature, an indicator, such as a green LED, indicates that the payload device is in a racing mode and that the control module is in an idle state/mode. When power is detected at, or supplied to, the armature of the solenoid, the plunger pulls and a red LED indicator indicates that the state of the control module is a deployment state/mode.

Step 332 includes deployment actuator 206 receiving the deployment activation signal and deploying the parachute.

Figure 4:
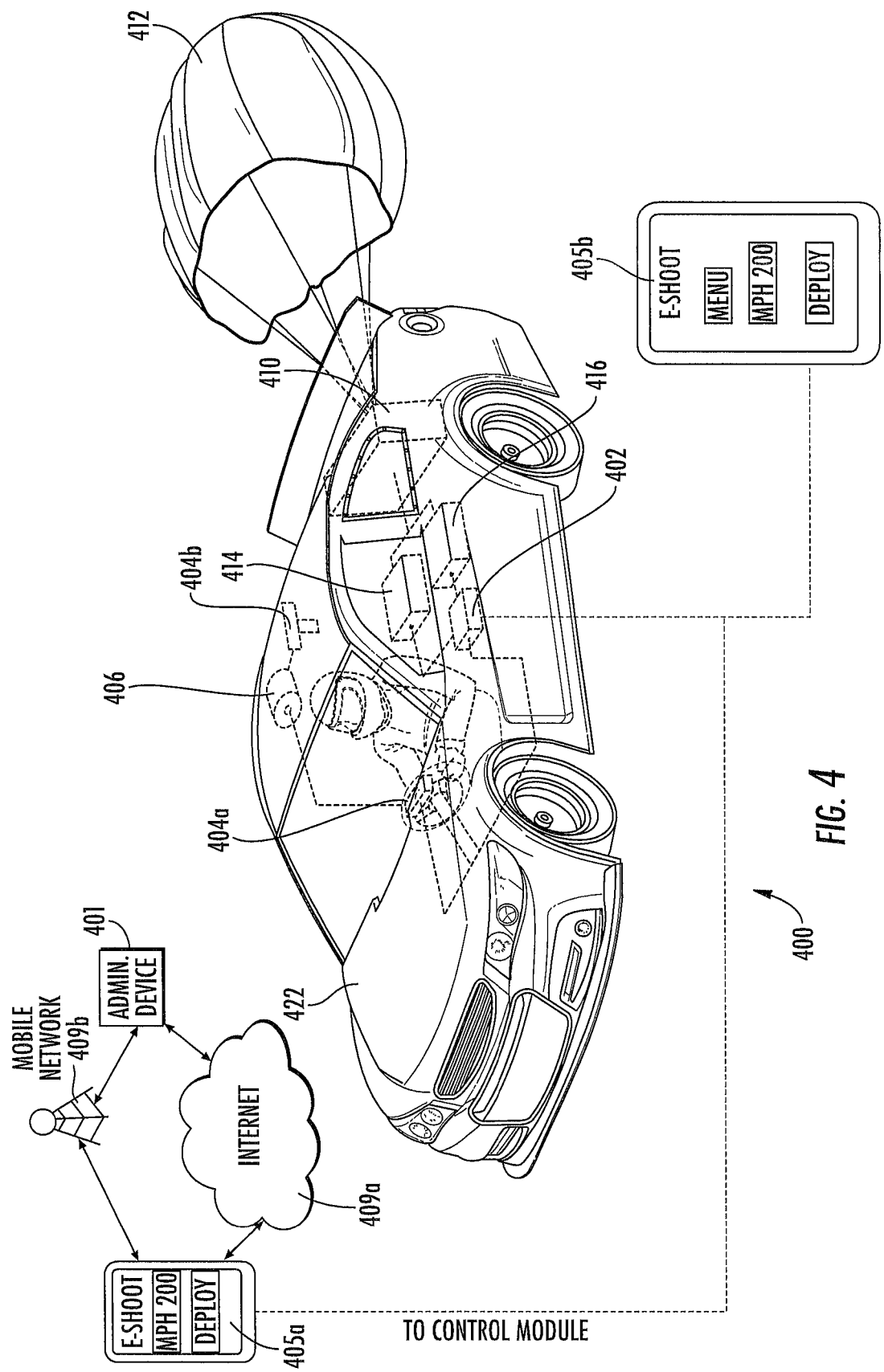
FIG. 4 is a schematic diagram of a network for remote electronic parachute deployment.

Referring now also to FIG. 4 in the drawings, a distributed parachute deployment network 400 is illustrated. Network 400 includes administrator device 401, control module 402, electronic button actuator 404a, lever actuator 404b, and solenoid 406, mechanically and/or electrically connected to racecar 422. For example, control module 402 is mechanically connected to the roll cage of the car. By way of another example, the control module 402 is electrically or communicatively connected to a control sensor, such as a sensor connected to an engine control unit (ECU) or engine control module (ECM) of the racecar.

A first remote device 405a, such as a smart phone having client software installed or downloaded thereto, is communicatively coupled to the racecar and to a wide area network (WAN), such as Internet 409a, or to a mobile network 409b.

Admin device 401 is connected to either Internet 409a or mobile network 409b to facilitate administrative functions, including password tracking and user interface (UI) software updates. Preferably, admin device 401 includes a cloud server, a personal desktop computer, a gateway computer, a router, a switch, a hub, or combinations thereof.

In a preferred embodiment, first remote device 405a is used by a racing official or someone in the announcing box. In other embodiments, the first remote device 405a is used by military personnel, NASA technicians, and other ground crew to remotely deploy a parachute attached to a payload.

A second remote device 405b is communicatively coupled to the racecar and to the Internet or mobile network. Second remote device 405b is operated by a member of the pit crew, or at a different location than the first remote device. The first and second remote devices include, but are not limited to, mobile phones, tablet computers, personal digital assistants (PDAs), a laptop computer, a digital music player, or other similar media device.

Preferably, each UI of each remote device communicatively coupled to network 400 includes a status indicator, such as the MPH of racecar, as well as an interactive icon, allowing for remote deployment of the parachute from parachute release container 410 based on the status indicator as well as the observations of the remote device operator. The UI may include multiple status indicators, including but not limited to, engine status, pressure gauge readings, RPMs, temperatures, fluid levels, and other data available to an ECM or ECU. Although not depicted, each UI may also include a status indicator for operability of each component of the parachute deployment system. For example, a status indicator may provide current voltage level of the first battery 414, voltage level of the redundant battery 416, a racing mode of the control module, a deployment mode of the control module, and an actual deployment state of the parachute. For instance, a sensor associated with the parachute indicates when actual deployment occurs.

Each remote device connected to network 400 is also programmed or pre-programmed with authorization from admin device 401 to activate deployment of parachute 412. For example, the admin device is used to install the private encryption key on each authorized remote device connected to the network. It is noted that although an application installed on a remote device includes all necessary and available features, the admin device is used to grant or deny permissions or access to certain features of the deployment executable application. For example, certain military personnel operating remote devices may have access to see status indicators, while only the commanding officer may have access to activate parachute deployment.

Figure 5:
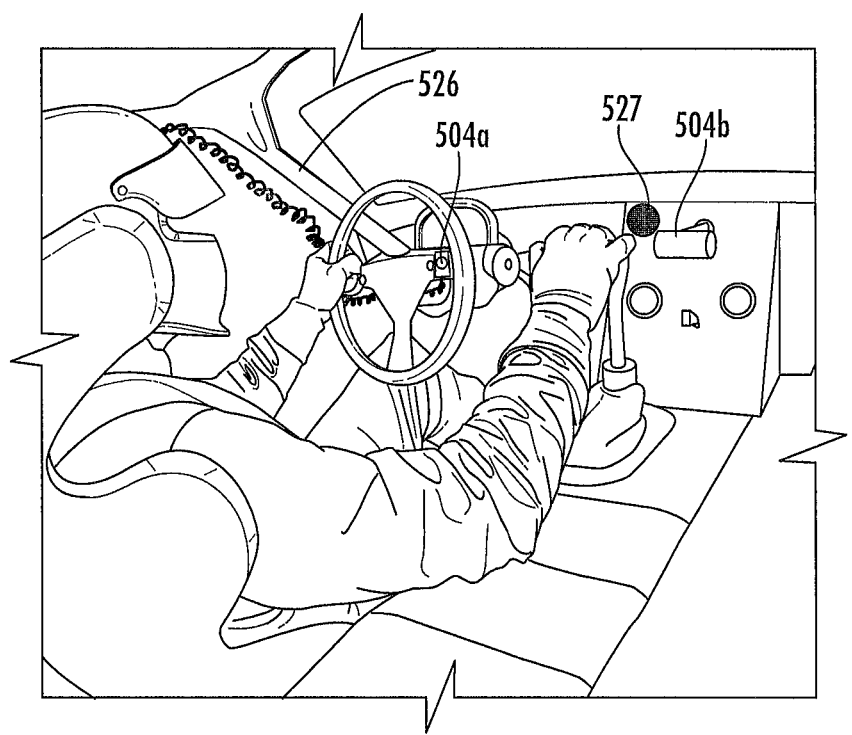
FIG. 5 is a perspective view of the internal driver compartment of a racecar having an electronic parachute deployment feature.

Referring now also to FIG. 5 in the drawings, an interior portion of racecar 422 is illustrated. Racecar 422 includes electronic button actuator 504a and lever actuator 504b. Button actuator 504a is a configuration used for retrofitting racecars without the electronic chute deployment system installed by a manufacturer. Lever actuator 504b is a control-interfacing deployment actuator that is installed by a manufacturer.

Preferably, each chute deployment actuator is located in proximity to hands of the driver relative to a driving grip to minimize reaching distances. For example, button actuator 504a is located on the steering wheel such that driver reach distance is at a minimum. By way of another example, lever actuator 504b is located near the steering wheel or hand of the operator to minimize reaching. It is noted that lever actuator 504b offers redundancy to the electronic actuation of button actuator 504a. For example, the redundancy can be mechanical redundancy, electrical redundancy, optical redundancy, or combinations thereof.

In at least one embodiment, a driver attempts to pull the lever actuator 504*b* and realizes parachute deployment does not occur. Using audio input/output (I/O) user interface (UI) 527, such as a speaker and microphone, located in the helmet or on the dashboard of the racecar, the driver indicates to pit crew, racing officials, or an operator of a remote device that mechanical and/or electrical local deployment is not possible. Upon receiving this indication, the operator of the remote device provides user input to the remote device to remotely actuate deployment of the parachute. For example, an active icon for parachute deployment may be activated from a smart phone being used by the pit crew of the driver to remotely deploy the parachute.

In at least one embodiment, the audio I/O UI 527 receives a voice command from the payload operator to deploy the parachute. The voice command may be a verifiable command, and may require user confirmation of the command.

Referring now also to FIG. 6A in the drawings, a perspective view of control module 602, button actuator 604, solenoid 606, and lever actuator 608 is illustrated. Lever actuator 608 pivots at a pivot point 611 when it is actuated.

In a preferred embodiment, lever actuator 608 is adjustable using adjustment holes 613. Lever actuator 608 is connected to a plunger connection assembly, which connects the lever to solenoid 606. In a preferred embodiment, solenoid 606 is a pull solenoid.

Solenoid 606 is attached to roll cage 626 of the car using U-bolts, clamps, braces, mounts, fasteners, and other attachment means. The redundant mechanical cable is attached to roll cage 626 using a cable mount or connector, including fasteners, zip ties, and other attachment means.

Control module 602 is attached to the roll cage of the car using U-bolts, clamps, braces, mounts, fasteners, and other attachment means. The control module includes indicator 630 to indicate the deployment status of the parachute, to indicate the control status of the control module, or a combination thereof. Mechanical cable 628 runs along the length of the car to a release mechanism located at the rear of the vehicle.

In at least one embodiment, cable 628 includes a wire so that an electrical pulse is sent from the control module down the wire and returned back to the control module. In the event cable 628 is cut, the return pulse is not received by the control module. When the pulse is not received, the control module receives an indication of mechanical actuator inoperability. The control module indicates this inoperability on the UI of any remote device connected to the parachute deployment network.

Control module 602 includes port 632 on a single side of the module. The port 632 is used for all electrical ingress and egress. For example, ground wire 634 and power supply wire 636 each enter/exit the port and are connected to ground and the battery switch respectively. Coiled button actuator wire 638 enters/exits port 632 and is connected to the button actuator located on the steering wheel.

Lever actuator 608 receives force 640 to actuate deployment of the parachute. For example, force 640 is supplied by control module 602 sending an electronic activation signal to solenoid 606 to pull the plunger, thereby pulling and pivoting lever actuator 608. By way of another example, force 640 is supplied by the driver reaching up and manually pulling the lever.

When the solenoid receives force 640 using an electronic activation signal, a second wireless activation signal is generated and sent simultaneous with receipt of the first activation signal at the control module. This second wireless activation signal is sent to a linear actuator of a release mechanism to deploy the parachute (see FIGS. 7-8C below).

In a preferred embodiment, a control sensor 642 is communicatively coupled with the control module 602. Control sensor 642 is configured to detect activation of an actuator or a component of an actuator. For example, control sensor 642 could be a hall-effect sensor, a proximity sensor, an optical sensor, or any combination of them. When cable 628 is activated, control sensor sends a signal to the control module 602 to indicate activation or a movement of the cable. In other embodiments, the control sensor 642 may be integral to an engine of the vehicle, and may indicate when a component, such as the engine solenoid, is active and/or inactive.

Referring now also to FIG. 6B in the drawings, lever actuator 608 has received force 640 and has assumed an actuated position, which moves the plunger of the solenoid and increases the tension on cable 628. The mechanical movement of the lever and increase in cable tension causes a redundant mechanical manipulation at the release mechanism to deploy the parachute in the event the electronic deployment is inoperable or delayed. Alternatively, the mechanical manipulation may be inoperable due to a cut or inoperable cable, in such circumstances the remote actuation feature of the parachute deployment system offers a redundant electrical manipulation at the release mechanism to deploy the parachute.

Figure 7:
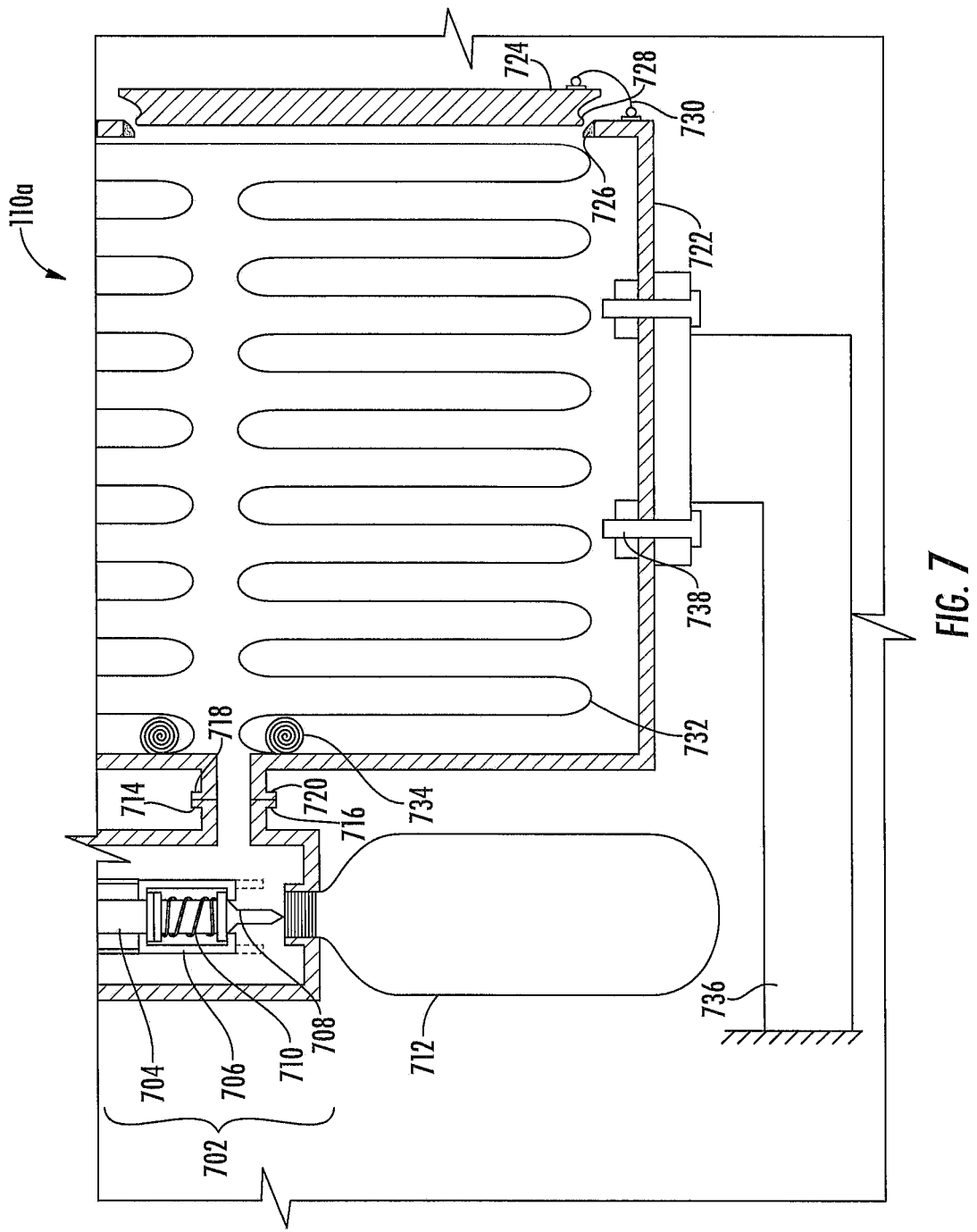
FIG. 7 is a cross-sectional view of a release mechanism and parachute container.

Referring now also to FIG. 7 in the drawings, a preferred embodiment of the release mechanism of parachute container 110*a* is illustrated. Release mechanism 702 includes cable 704 attached to linear actuator 706 and puncture needle 708.

Puncture needle 708 is biased by biasing means, such as spring 710. Puncture needle 708 is in close proximity, adjacent to, or abutting a seal of CO2 canister 712. It is noted that although canister 712 is depicted as a $CO_2$ canister, other inert gases are encompassed by the features of the present application. For example, nitrogen or air may be used in lieu of $CO_2$.

Preferably, when the release mechanism is actuated, puncture needle pierces the seal of $CO_2$ canister 712, allowing pressurized $CO_2$ to pass through a channel created by first flange 714, second flange 716, third flange 718, and fourth flange 720. Third flange 718 and fourth flange 720 are removably connected to first flange 714 and second flange 716 and are associated with rigid parachute container 722.

Rigid parachute container 722 includes lid 724, gasket or rubber seal 726, and beveled edge 728. Gasket 726 and beveled edge 728 are formed of a specific shape to ensure a gauged release occurs when rigid parachute chamber 722 obtains a specific pressure. Lid 728 includes a connector 730 attached to the lid and parachute container 722 to retain the lid proximal to the parachute container after deployment of parachute 732.

Parachute 732 includes leads, lines, or cables spooled onto spool 734. Spool 734 includes a handle (not shown) and a crank attached to the spool and extending beyond the exterior of the parachute container in order to reel the lines back in and refold the parachute after deployment.

Parachute container 722 is mounted to, or within, the racecar using mount 736. Mount 736 includes rubberized fasteners 738, or self-sealing fasteners, such that the parachute chamber can remain pressurized without leaking.

In an alternative embodiment, such as when the parachute deployment system is installed on high-altitude surveillance drones, a pressurized parachute container is the component that is punctured or opened, exposing the inner contents to the lower pressure of the atmosphere. In this embodiment, the parachute deployment relies on the pressure differential between the pressurized parachute compartment and the low atmospheric pressure to emit the parachute into the atmosphere.

Figure 8A:
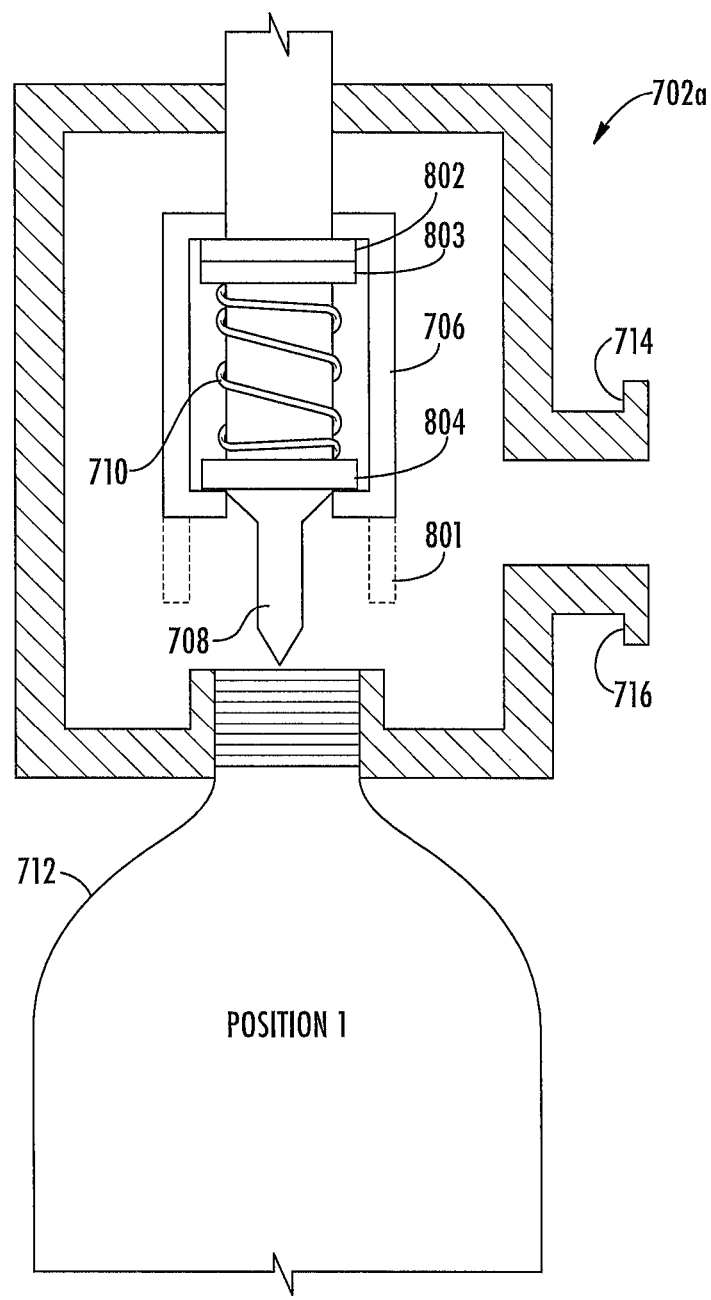
FIG. 8A is a cross-sectional view of a portion of the release mechanism of FIG. 7 in a resting position.

Referring now also to FIG. 8A in the drawings, linear actuator 706 is mounted on an internal set of tracks 801, or other movement means. Release mechanism further includes first cable stop 802, second cable stop 803, and third cable stop 804.

Figure 8B:
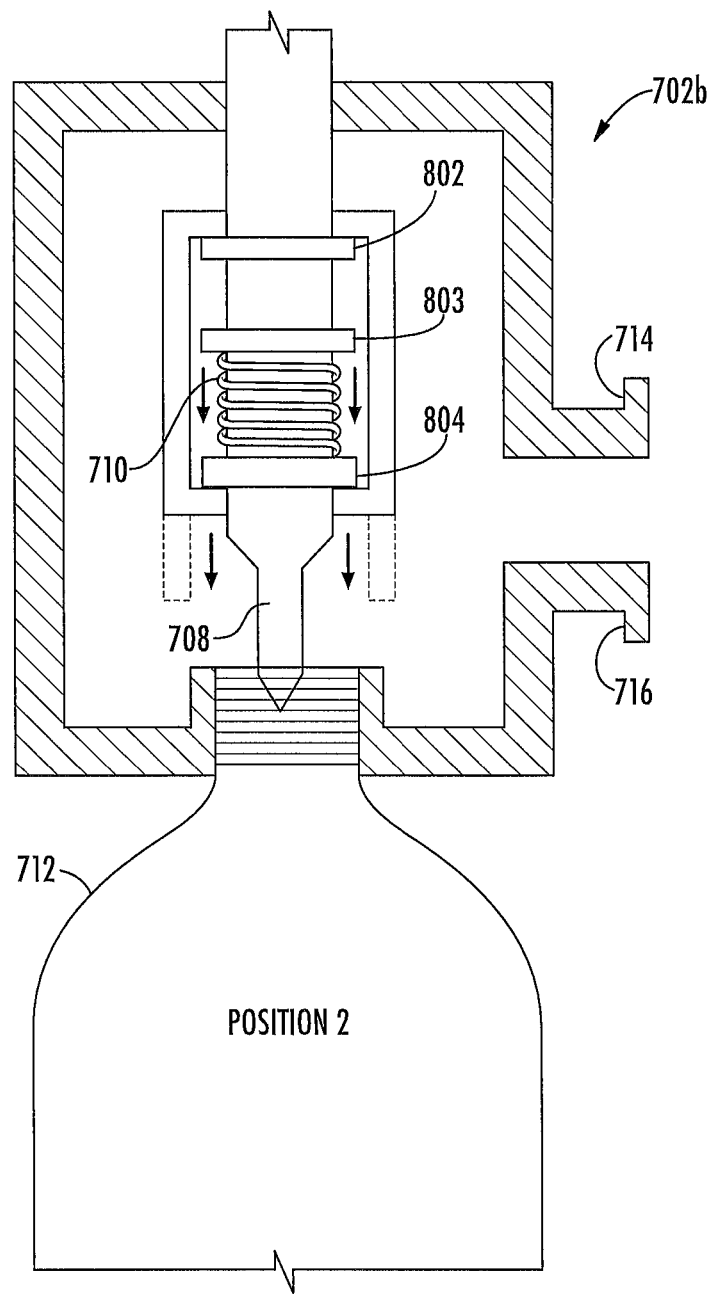
FIG. 8B is a cross-sectional view of a portion of the release mechanism of FIG. 7 in an actuated position.

Referring now also to FIG. 8B in the drawings, when the release mechanism is mechanically actuated by cable 628 or cable 704, third cable stop 804 prevents cable 628 or cable 704 from moving while the increased cable tension extends puncture needle 708 into the seal on CO2 canister 712. It is noted that the mechanical actuation is redundant to the electrical actuation depicted below.

Figure 8C:
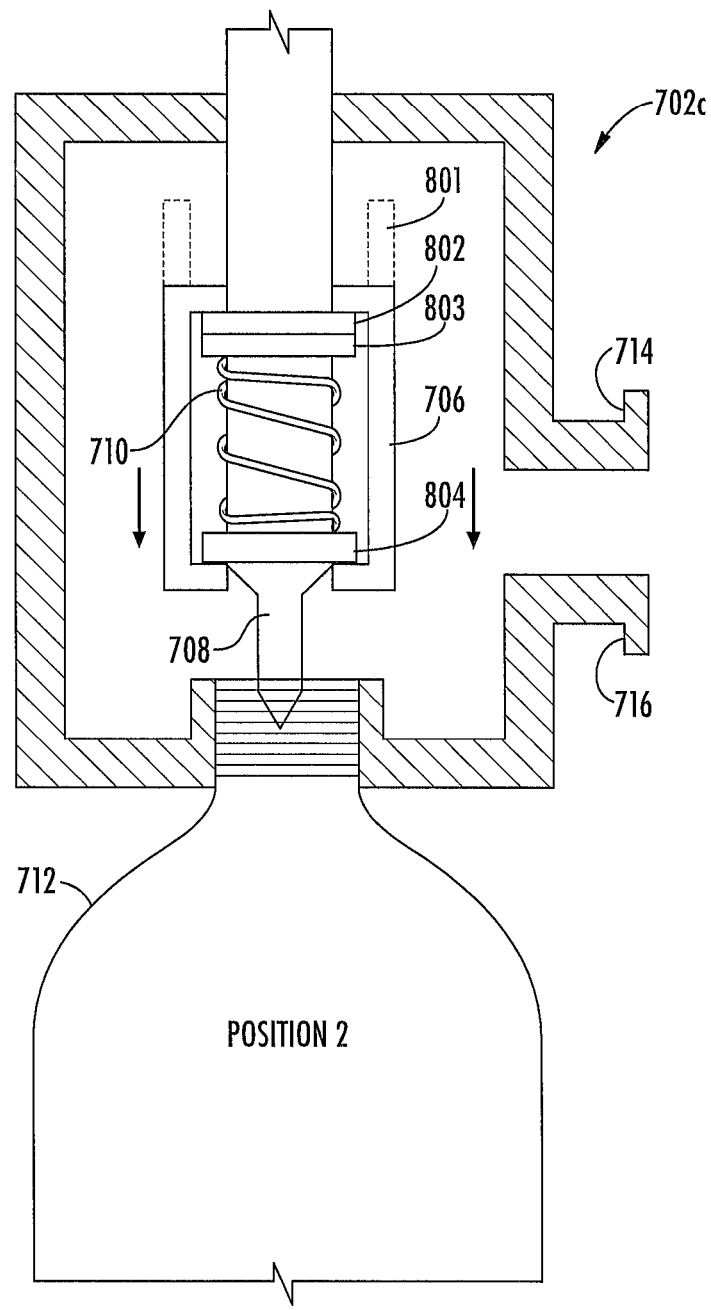
FIG. 8C is a cross-sectional view of a portion of the release mechanism of FIG. 7 in an actuated position.

Referring now also to FIG. 8C in the drawings, when a wireless activation signal is received by linear actuator 706, the linear actuator moves a housing of the linear actuator which abuts first cable stop 802. The movement of the housing corresponds with track 801, and extends puncture needle 708 into the seal of CO2 canister 712.

Figure 9:
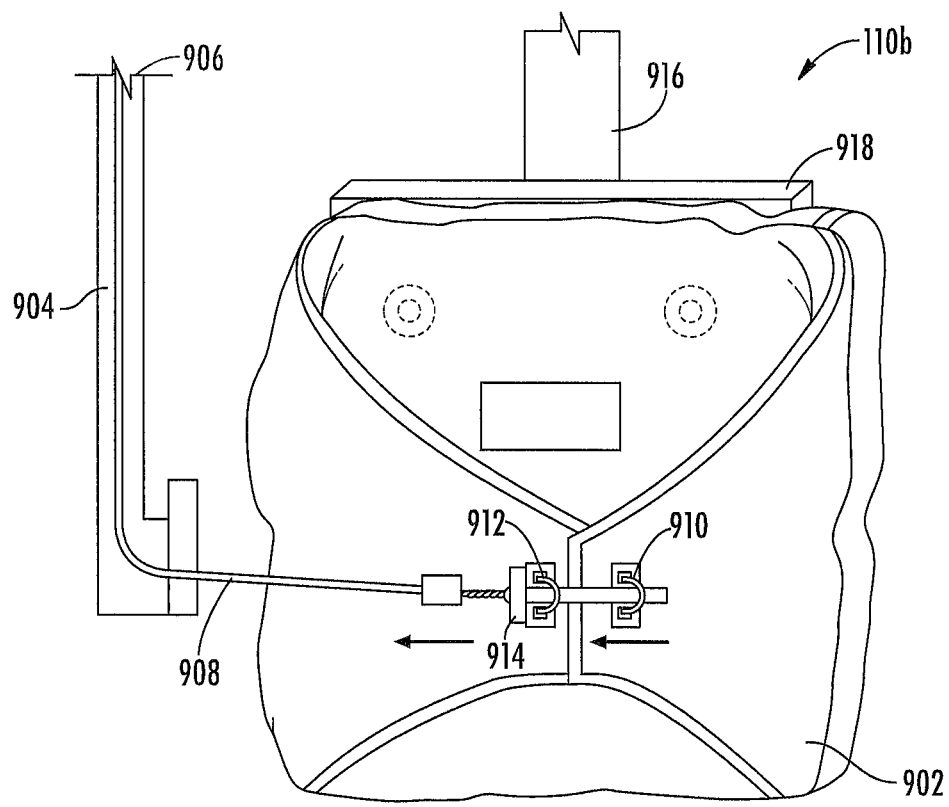
FIG. 9 is a perspective view of a flexible parachute container.

Referring now also to FIG. 9, a release mechanism of an embodiment of a parachute container 110b is illustrated. The parachute container 902 is a semi-rigid or flexible parachute container. Parachute container 110b is connected to car mount 904, which has a distal end 906 attached to the racecar. Cable 908 is attached to car mount 904 and extends to parachute container 902.

Parachute container 902 includes first pin loop 910 and second pin loop 912. Pin 914 extends through first pin loop 910 and second pin loop 912. Upon receiving mechanical or electrical activation at the solenoid, cable tension is created to pull pin 914 through the loops and release the parachute folded within the flexible container. Pin 914 includes a straight pin, detent pin, quick-release pin, and combinations thereof.

Parachute container 902 is attached to the racecar using axial car mount 916, which runs along a center axis of the racecar. Mounting plate 918 is attached to car mount 916 and to flexible parachute container 902. The attachment may include threaded attachment, clasps, rivets, pins, screws, bolts, glue, or a combination thereof. Mounting plate 918 includes one or more holes formed through the plate, enabling wind current, or pressurized gas from a canister attachment, to pass through the holes to help eject the folded parachute from the chamber.

Figure 10A:
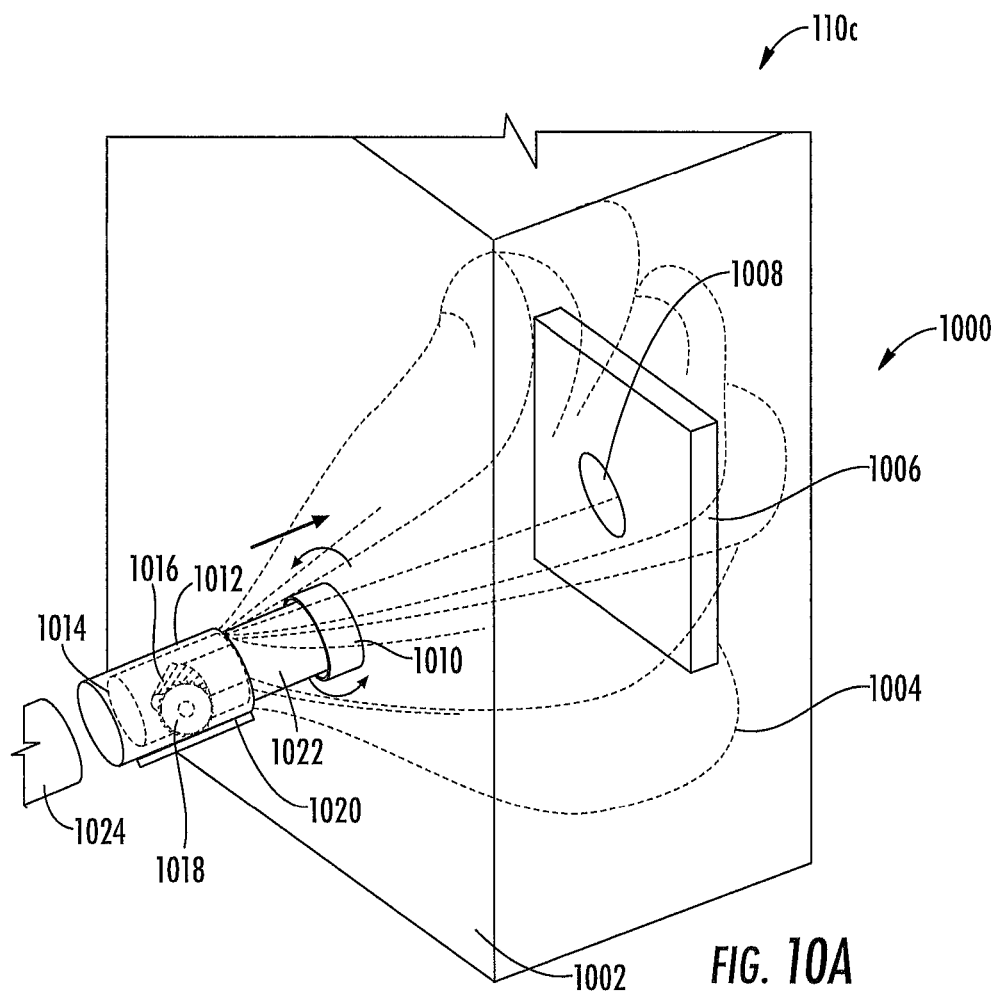
FIG. 10A is a perspective view of a rigid parachute container.
Figure 10B:
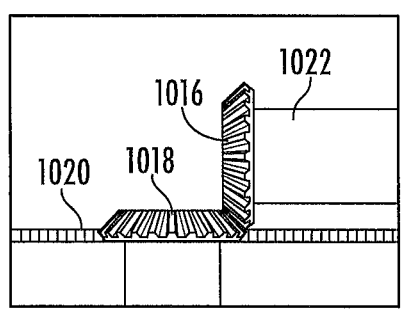
FIG. 10B is a top view of gears of a release mechanism.

Referring now also to FIGS. 10A and 10B in the drawings, a release mechanism for an embodiment of a parachute container 110c is illustrated. Parachute container 110c includes release mechanism sub-assembly 1000. Release mechanism sub-assembly 1000 includes a semi-enclosed release box frame 1002, parachute 1004, and parachute holding plate 1006. At least a back portion of a rear panel of release box frame 1002 is exposed, non-enclosed, or connected to a pressurized gas canister. In a preferred embodiment, parachute holding plate 1006 is attached to a top portion of the parachute and is made from light-weight, durable material, such as a titanium alloy or carbon composite fibers.

Parachute holding plate 1006 includes an elongated elliptical hole that corresponds to elliptical head 1010 of cam locking device 1012. Cam locking device 1012 includes cam chamber 1014 and a cam housing. The cam housing is securely attached to the racecar and may include an opening to allow gears to translate back and forth, and an opening for a linear actuator interface. Cam chamber 1014 houses cam gears, including first bevel gear 1016 and second bevel gear 1018. Second bevel gear 1018 includes a toothed edge that runs along track 1020. When the gears rotate as the teeth of the second bevel gear move along track 1020, cam shaft 1022 rotates. The rotation of cam shaft 1022 either locks or unlocks holding plate 1006 depending on the direction the cam locking device moves. Cam linear actuator 1024 connects, or is otherwise attached to, the cam locking device to move the locking device back and forth, respectively locking and unlocking the holding plate. Although not shown, release box frame 1002 may further include spools with crank handles for re-winding the parachute lead lines after deployment. Although the attachment of the parachute 1004 is depicted as being attached to the cam housing of the cam locking device, other attachment configurations are encompassed herein. For example, lead lines may be attached to spools with crank handles (not shown) that are attached to portions of the box frame 1002.

Figure 11:
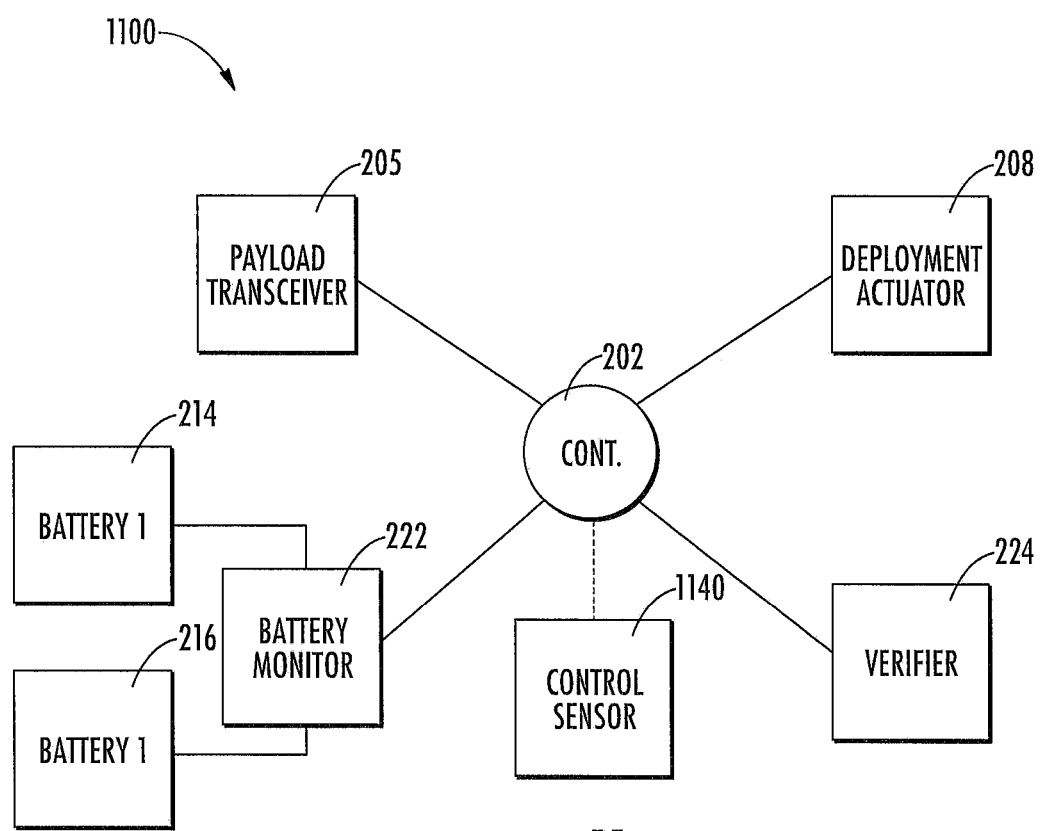
FIG. 11 is a block diagram of a control module.

Referring now also to FIG. 11 in the drawings, a control diagram for control operation 1100 of control module 202 is illustrated. Control module 202 is communicatively coupled to payload transceiver 205, a deployment actuator, such as deployment actuator 206 and/or release mechanism 208, battery monitor 222, and verifier 224. Battery monitor 222 is coupled with first battery 214 and second battery 216 and includes a switch. Control module 202 is optionally communicatively coupled with control sensor 1140. For example, a sensor of an ECM or ECU may be communicatively coupled with the control module to relay solenoid information from the ECM or ECU to the control module. The coupling of the control sensor 1140 is optional when retrofitted embodiments do not utilize ECM/ECU monitoring or redundant deployment actuator positon monitoring. The communicative coupling of parachute deployment components to control module 202 can include wired, wireless, infrared, Bluetooth, and similar connections, as with a controlled area network (CAN).

Figure 12:
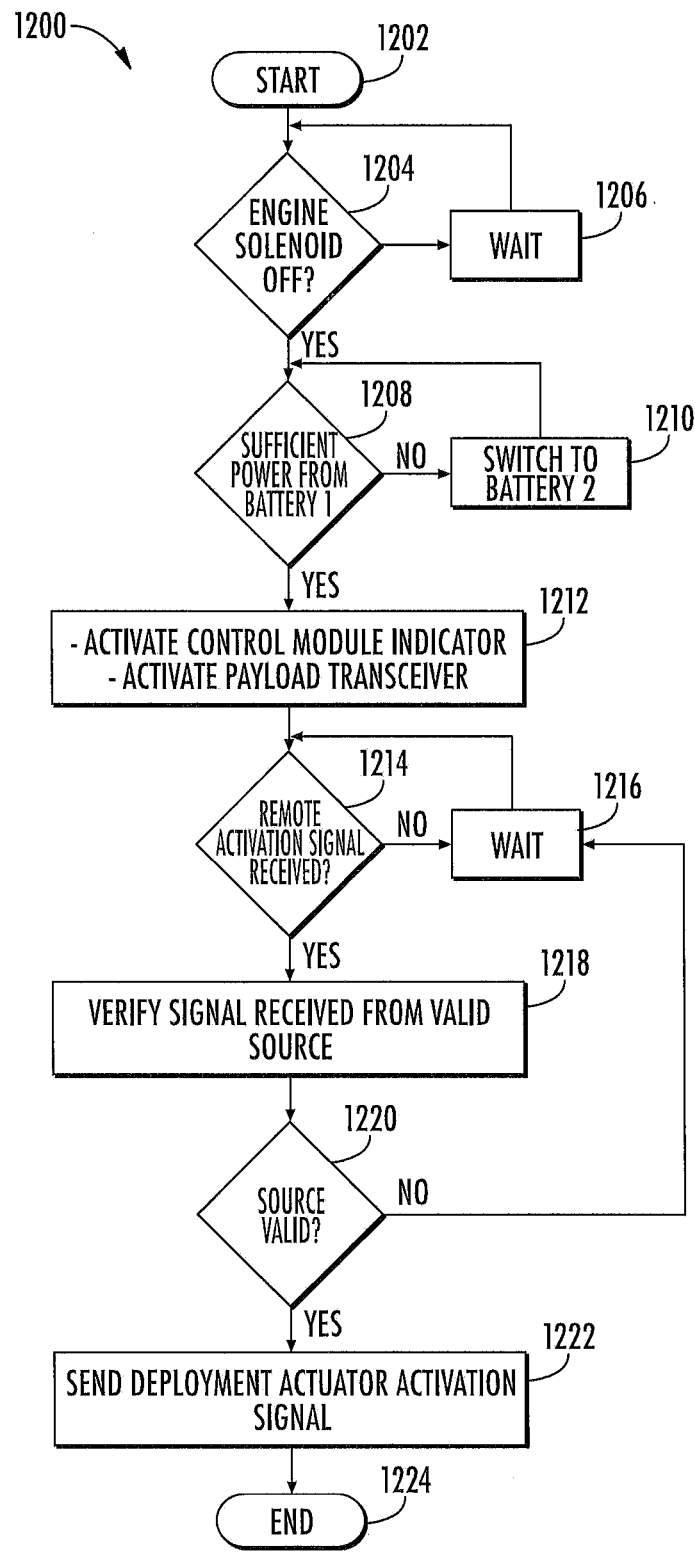
FIG. 12 is a flow chart of a method for electronic parachute deployment using the control module of FIG. 11.

Referring now also to FIG. 12 in the drawings, method 1200 for remote electronic parachute deployment is illustrated. Method 1200 starts at step 1202 by an administrator providing public and private keys to the control module and the remote device. Step 1202 further includes a user installing the deployment client software onto appropriate remote devices, or installing necessary updates.

Step 1204 includes checking a control sensor. For example, the engine solenoid may be checked to ensure power is not still being sent to the engine solenoid to start the car. Step 1204 further includes checking the status of the engine ignition. These checks occur to determine a mode or state of the deployment control module. For example, if the ignition is on and the solenoid received power, but is no longer receiving power, then a racing mode is determined.

Step 1206 includes entering a control state based on a condition of the control sensor checked in step 1204. For example, the control module determines the engine solenoid is still being powered, or is not off. Therefore, step 1206 includes entering a wait or delay state.

Returning to step 1204, the condition of the control sensor is again determined. For example, the control module determines that the engine solenoid is off.

Step 1208 includes determining a state of one or more power supplies. For example, step 1208 includes determining that voltage available in the first battery is insufficient or below a threshold value.

Step 1210 includes activating a switch or relay based on the state of the one or more power supplies. For example, step 1210 includes switching the power supply from the first battery to the redundant battery.

Returning to step 1208, includes entering a power control state based on the state of one or more power supplies. For example, the control module determines that power from the first battery is sufficient or above a threshold value and so a power control state using a primary power supply, or the first battery, occurs.

Step 1212 includes activating components of the parachute deployment system. For example, a control module indicator is activated. By way of another example, a payload transceiver is activated.

Step 1214 includes determining a state of a receiver or a transceiver of the payload device. For example, step 1214 includes determining that no remote deployment activation signal is received by the transceiver of the racecar.

Step 1216 includes entering a control state/mode based on the state of the receiver determined in step 1214. For example, the control module may enter a wait or receive state until an activation signal is received.

Returning to step 1214, the control module determines a second state of the receiver or transceiver of the payload device. For example, the control module determines that a remote deployment activation signal is received.

Step 1218 includes entering a control state based on the second state of the receiver or transceiver of the payload device. For example, the control module may enter a verification state, verifying the remote deployment activation signal is authorized or from a trusted source.

Step 1220 includes determining a condition of a signal using the verification state. For example, step 1220 includes determining that the source of a signal is not a trusted source.

Step 1216 includes entering a control mode/state based on the determination of the condition of the signal. For example, when the source is not trusted, the control module and the payload transceiver, at step 1216, waits or remains in receive mode until an activation signal is received from a trusted or authorized source. In at least one embodiment, source identifiers associated with the untrusted source are stored to block future access attempts.

Returning to step 1220, the control module determines that the deployment activation signal is authorized or from a trusted source. Step 1222 includes entering a control state/mode based on the determination that the source of the signal is a trusted source. For example, step 1222 includes a sending mode/state, where the control module activates the transceiver for sending a deployment actuator activation signal.

In at least one embodiment, the deployment actuator is a solenoid. Therefore, step 1222 includes determining power was sent to an armature of the solenoid, meaning that the plunger has been pulled. Simultaneous with sending power to the armature, power is sent to an indicator to indicate a deployment state of the control module.

Step 1224 includes ending the method of remote parachute deployment by resetting features of the system. For example, the parachute may need to be refolded and restored in its release compartment. By way of another example, short-term memory of the control module may be cleared to remove status indicators or sensory data that were applicable to an individual race. In an alternative embodiment, data associated with the individual race is sent to a data analytics unit. For example, admin device 411 is configured to receive statistics associated with each race performed by a racecar and operating conditions when parachute deployment occurred. After a threshold number of races and data analytics for those races are performed, the deployment executable application installed on a client device may include a feature that indicates suggested parachute deployment. For instance, if the MPH, RPMs, and time of engine operation above a certain level of RPMs coincides with corresponding average levels existing when previous parachute deployment happened, then the application may provide a suggested parachute deployment icon or other warning indicator.

It is noted that using the features of the present application allow payload operators, such as racecar drivers, pit crews, or racing officials, to quickly activate important safety measures, such as parachute deployment. This further enables redundant activation channels, including electronic and mechanical activation. Using these redundant channels, the safety of payload operators is significantly increased. These redundant channels further ensure the safety of the payload itself. For example, racecars, UAVs, personal items shipped by drones, and multi-million dollar aircraft each represent significant investments of money and time. The use of redundant mechanical and electrical deployment provides added security to these highly valued items.

It is further noted that embodiments of the present application use a server. In these embodiments, a server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load.

In some embodiments, a remote device includes a computer type user terminal device, such as a PC or tablet computer. These types of remote devices similarly include a data communication interface CPU, main memory and one or more mass storage devices for storing user data and the various executable programs.

In some embodiments, a remote device includes a mobile device type user terminal. These types of remote devices may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs.

In some embodiments, a UI includes a microphone and speaker to enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature.

Therefore, embodiments of the methods of managing information about content transmission or data analytics outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Therefore, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the application(s), etc. shown as implemented in the drawings (see, e.g., FIG. 4). Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF), Bluetooth, and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

It is apparent that an invention with significant advantages has been described and illustrated. Although the present application is shown in a limited number of forms, it is not limited to just these forms, but is amenable to various changes and modifications without departing from the spirit thereof.

What is claimed is:

1. An electronic parachute control module communicatively coupled to a deployment actuator, a signal verifier, a solenoid, and a payload transceiver, comprising:
   a memory and a processor;
   wherein the memory includes a set of executable instructions that when executed by the processor causes the control module to perform the following:
      providing an authentication key;
      decrypting a deployment activation signal;
      sending the decrypted deployment activation signal to a deployment actuator to deploy a parachute from the payload device;
      determining a state of the solenoid; and
      indicating a parachute deployment mode based on the state of the solenoid; and
   wherein the parachute deployment causes the payload device to slow or stop, ensuring the safety of the payload device and its contents.

2. An electronic parachute deployment control module communicatively coupled to a deployment actuator, a signal verifier, a payload transceiver, and a power supply monitor, the electronic parachute deployment control module comprising:
   a memory; and
   a processor;
   wherein the memory includes a set of executable instructions that when executed by the processor causes the control module to perform the following:
      providing an authentication key;
      decrypting a deployment activation signal; and
      sending the decrypted deployment activation signal to a deployment actuator to deploy a parachute from the payload device;
   wherein the parachute deployment causes the payload device to slow or stop, ensuring the safety of the payload device and its contents;
   wherein the signal verifier uses a second authentication key to decrypt a signal and verifies a voltage associated with the deployment activation signal; and
   wherein the power supply monitor determines a level of a power supply to active a redundant power supply.

3. The electronic parachute control module of claim 2, further comprising:
   an indicator;
   wherein the indicator is configured to indicate an operation of the control module or parachute deployment mode of the control module.

* * * * *